United States Patent
Rathod et al.

(10) Patent No.: US 9,186,602 B2
(45) Date of Patent: Nov. 17, 2015

(54) FILTER ELEMENT WITH AUTOMATIC AIR BLEEDING

(71) Applicant: CUMMINS FILTRATION IP, INC., Minneapolis, MN (US)

(72) Inventors: Jignesh Rathod, Cookeville, TN (US); Mark T. Schoolfield, Pleasant Shade, TN (US); Ajay D. Joshi, Pune (IN); Steven D. Trusty, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 314 days.

(21) Appl. No.: 13/861,728

(22) Filed: Apr. 12, 2013

(65) Prior Publication Data

US 2013/0269533 A1 Oct. 17, 2013

Related U.S. Application Data

(60) Provisional application No. 61/623,798, filed on Apr. 13, 2012.

(51) Int. Cl.
*B01D 19/00* (2006.01)
*B01D 36/00* (2006.01)
*B01D 29/23* (2006.01)

(52) U.S. Cl.
CPC .......... *B01D 19/0031* (2013.01); *B01D 29/232* (2013.01); *B01D 36/001* (2013.01); *B01D 36/003* (2013.01); *B01D 2201/0415* (2013.01); *B01D 2201/291* (2013.01); *B01D 2201/305* (2013.01); *B01D 2201/316* (2013.01); *B01D 2201/347* (2013.01)

(58) Field of Classification Search
None
See application file for complete search history.

(56) References Cited

U.S. PATENT DOCUMENTS

| | | | |
|---|---|---|---|
| 5,462,658 | A | 10/1995 | Sem |
| 6,709,588 | B2 | 3/2004 | Pavlin et al. |
| 7,014,766 | B2 | 3/2006 | Mack et al. |
| 7,147,110 | B2 | 12/2006 | Clausen et al. |
| 7,299,931 | B2 | 11/2007 | Schachtrup et al. |
| 2009/0078626 | A1 | 3/2009 | Krull et al. |
| 2009/0139920 | A1 | 6/2009 | Dhawale et al. |
| 2012/0024771 | A1 | 2/2012 | Abdalla et al. |
| 2013/0248436 | A1* | 9/2013 | Hacker et al. ............. 210/457 |

FOREIGN PATENT DOCUMENTS

WO WO 2005/011838 2/2005

OTHER PUBLICATIONS

International Search Report and Written Opinion for PCT/US2013/036393, issued Jul. 14, 2013, 9 pages.

* cited by examiner

*Primary Examiner* — Benjamin Kurtz
(74) *Attorney, Agent, or Firm* — Foley & Lardner LLP

(57) ABSTRACT

A filter element that is provided with automatic air bleeding features to efficiently bleed air from a fuel filter module containing the filter element. The filter element has an upper end cap with one or two air vents. One of the vents provides a bypass for air through wet filter media through which air from the fuel supply may not be able to pass through easily. The inner air vent is located on the inside of a circle formed by attachment clips that attach the respective filter element to a removable cover. The inner air vent allows for air inside the filter module to be easily purged out via a drain hole on the fuel filter module, while providing resistance to fuel. The drain hole is provided on the filter module which is internally connected to the fuel outlet and therefore to the fuel tank.

13 Claims, 17 Drawing Sheets

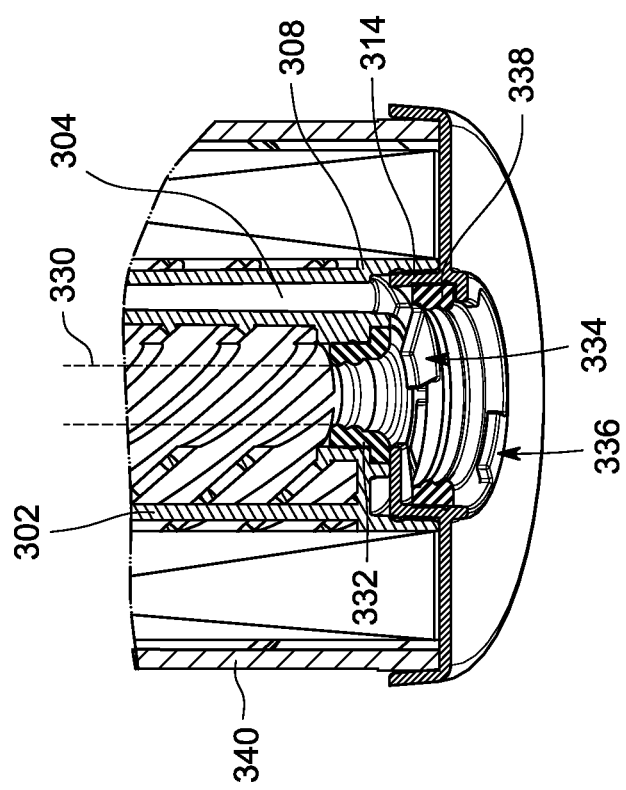
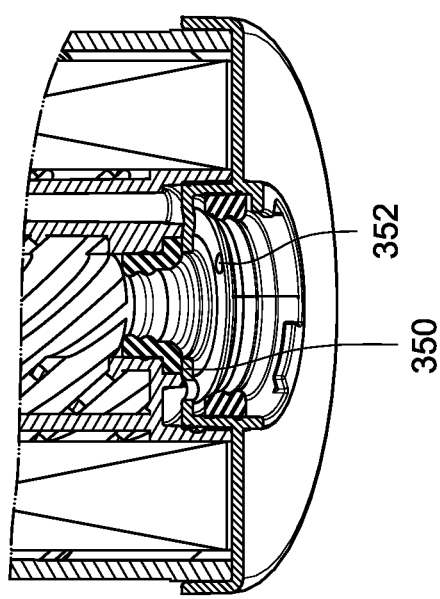

FILTER ELEMENT WITH AUTOMATIC AIR BLEEDING

FIELD

This disclosure relates to a filter element, in particular a fuel filter element, configured with automatic air bleeding features.

BACKGROUND

For heavy-duty diesel engines where achieving maximum fuel pressure is desired, any trapped air within large fuel housings can pose a great engineering challenge. Air can become trapped within the fuel housing in a number of ways, including as a result of a new filter element being installed in the housing and air entrained in fuel entering the fuel filter housing.

Manual external or internal air-bleed valves have been developed to purge air outside of the filter housing. Various automatic air bleeding fuel filter designs are also known. The use of external air-bleed valves can present additional possibilities of functional failure where fuel-leaks could occur. Moreover, to manually bleed air out, some amount of fuel can spill out of the housing posing safety risks to the operator. The same safety risks apply to draining the fuel manually out of the housing during filter replacement.

In addition, fuel supply to a high pressure fuel pump typically utilizes part of the returned fuel from an in-built reservoir of the fuel filter housing which could contain air that's already vented out from the fuel filter housing. Some of this air can make it back into the Stage-1 filter through the standpipe which is on the upstream or dirty side of the filter media. If the media air-vent is located on the downstream or "clean-side" of the filter media, then the air-vent functionality will be reduced or eliminated altogether and air from the fuel supply could cause engine performance issues if it does not get vented out.

SUMMARY

A filter element is described that is provided with automatic air bleeding features to efficiently bleed air from a filter housing containing the filter element. The described filter element and filter housing requires no manual air-bleeding from the fuel module during its service. To facilitate the description, the filter element will be specifically described as being a fuel filter element. However, the concepts described herein are applicable to any type of filter element/filter housing application where air needs to be bled from the filter housing.

Both stage-1 and stage-2 fuel filters will be described herein. The stage-1 filter element is described as having a first or upper end cap with two air vents, an inner air vent and a media air vent. The media air vent provides a bypass for air through wet filter media through which air from the fuel supply may not be able to pass through easily. The inner air vent is provided on both the stage-1 and the stage-2 fuel filters. In each case, the inner air vent is located on the inside of a circle formed by attachment clips that attach the respective filter element to a removable receptacle cover. The inner air vent allows for air inside the filter housing to be easily purged out via a drain hole on the fuel filter housing, while providing resistance to fuel. The drain hole is provided on the filter housing which is internally connected to the fuel outlet and therefore to the fuel tank. The removable filter element therefore needs to provide a hermetic passage from the upper end cap, through a center tube of the filter element, and through a bottom end cap.

In one embodiment, the stage-1 fuel filter can also use locating features to help locate the media air vent on the upstream or dirty side of the filter media. In particular, the center tube of the stage 1 filter element includes a pleat separation element, for example a wedge-shaped feature, that helps to separate two adjacent pleats between which the media air vent will be located. In addition, the center tube will include an alignment element that interacts with a corresponding alignment element on the upper end cap to help appropriately locate the media air vent on the upstream or dirty side of the filter element between the two adjacent pleats.

In one example, a filter element comprises a ring of filtration media having a first end and a second end and circumscribing a central cavity. A first end cap is sealingly attached to the first end of the filtration media, with the first end cap including a vent passageway. In addition, a second end cap is sealingly attached to the second end of the filtration media, with the second end cap including a plurality of vent openings extending therethrough. A center tube is disposed within the central cavity, with the center tube having a first end connected to the first end cap and a second end connected to the second end cap. The center tube further includes a fuel passageway and an air vent passageway, with the air vent passageway being fluidly separated from the fuel passageway and the air vent passageway being in fluid communication with the vent passage in the first end cap and with the vent openings in the second end cap. Also, first and second seals are attached to the second end cap, with the first seal being located radially inward of the second seal, the first seal being disposed within an opening formed in the second end cap, the second seal being disposed in a second opening formed by the second end cap, and the vent openings in the second end cap being between the first seal and the second seal.

When the filtration media is pleated, the filtration media has an unfiltered fluid side and a filtered fluid side, and the first end cap further includes a media vent passage radially outward from the vent passage. The media vent passage is disposed on the unfiltered side of the media between two of the pleats. To facilitate proper positioning of the vent passage, a pleat separation element can be formed on the center tube adjacent to the first end thereof and adjacent to the media vent passage on the first end cap, with the pleat separation element being disposed between the two pleats. The pleat separation element helps to separate the two pleats so that the media vent passage is properly located on the dirty or unfiltered fluid side of the filtration media between the two pleats.

In addition, an alignment element can be provided at the first end of the center tube that is engaged with a corresponding alignment element on the first end cap. The alignment elements help to ensure proper orientation of the center tube, to help properly position the pleat separation element relative to the media vent passage.

The filter element can include other elements as well, such as an outer coalescing element surrounding the filtration media. The outer coalescing element has a first end connected to the first end cap and a second end connected to the second end cap.

DRAWINGS

FIG. 18 illustrates the flow of vented air through the base end of the fuel filter element of FIG. 13.

FIG. 19 illustrates another embodiment similar to FIG. 18.

DESCRIPTION

Figure 1:
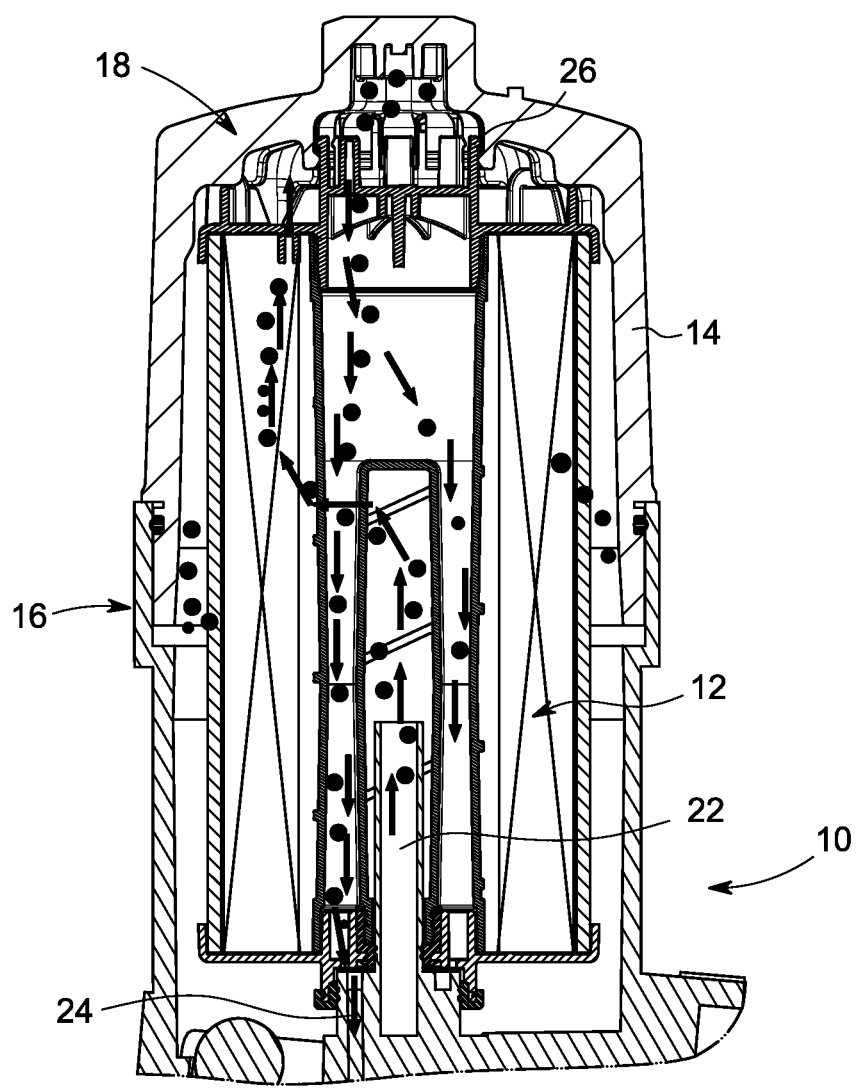
FIG. 1 illustrates a fuel filter described herein removably installed within a respective receptacle in a fuel filter module.

FIGS. 1-8 illustrate a stage 1 fuel filter assembly 10 that includes a fuel filter element 12 removably installed within a receptacle 14 of a fuel filter module. A stage 2 fuel filter assembly 200 is illustrated in FIGS. 9-12. The stage 1 filter element 12 is an inside-out flowing filter, while a stage 2 filter element 208, discussed further below, is an outside-in flowing filter. The stage 1 filter element 12 and the stage 2 filter element 208 are mounted within respective receptacles of a filter module in a side-by-side relationship and work in series. The receptacles for the filter elements are in communication with one another and effectively form a single larger cavity.

In operation, fuel that is filtered by the stage 1 filter element 12 flows from the receptacle for the stage 1 filter element into the receptacle for the stage 2 filter element 208. Fuel exiting out a lift pump (for example, a gear pump) has finely dispersed water droplets that the stage 1 filter's media material coalesces from smaller droplets into bigger drops which finally sink to the lower-most portion of the filter module. The stage 2 filter media removes finer hard particles. The stage 2 filter also strips out water droplets that make it through from the stage 1 filter. Filtered fuel exiting out of the stage 2 filter is then routed to a high pressure pump.

With reference to FIG. 1, the receptacle 14 includes a fixed housing 16 and a removable cover 18 that is removably attached to the fixed housing, for example using threads. In use, the cover 18 is attached to the fixed housing 16 so that the two define an interior volume sufficient to receive the fuel filter element 12. The cover 18 is sealed with the fixed housing 16 to prevent fuel leaks from the interior thereof. The cover 18 can be removed from the fixed housing to access the interior volume for removal of the filter element.

Figure 4:
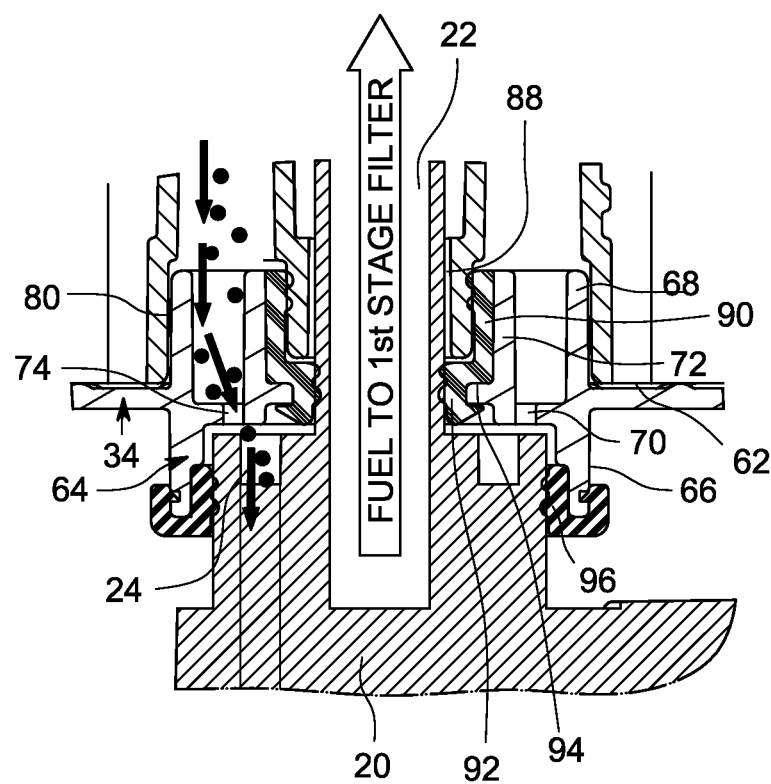
FIG. 4 is a detailed view illustrating the air bleed path near the base of the fuel filter.
Figure 5:
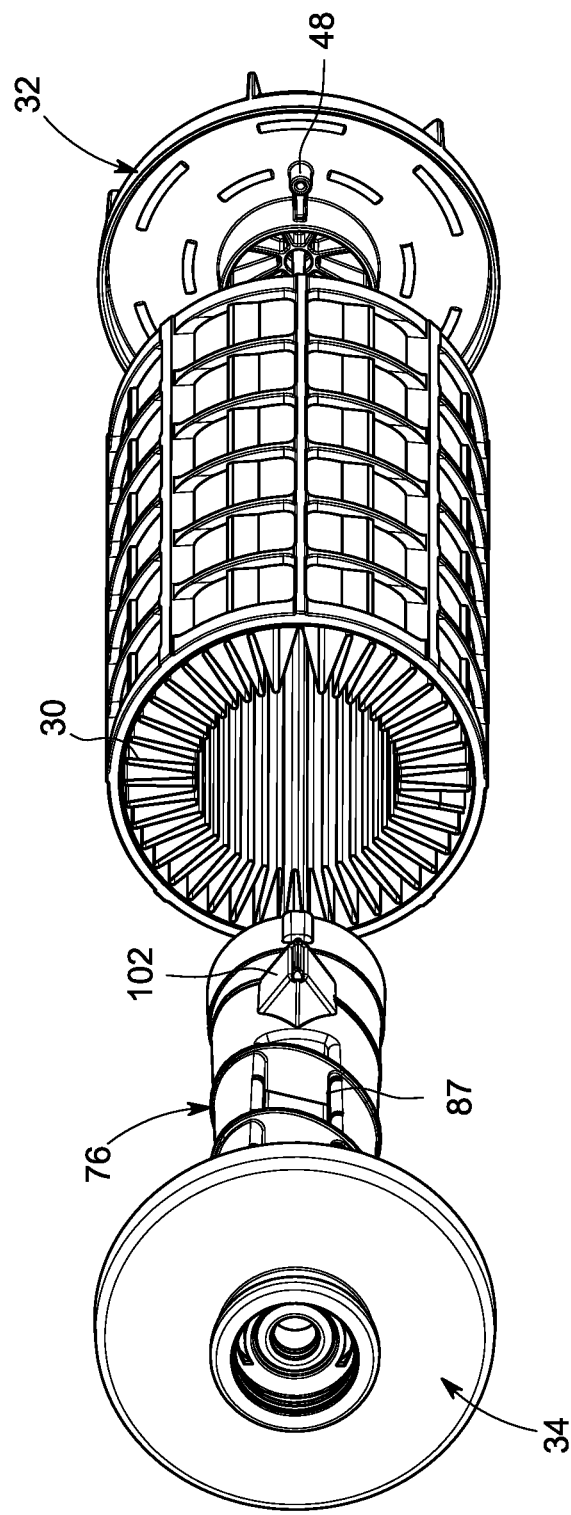
FIG. 5 is a partially exploded view of the fuel filter element illustrating a pleat spacer on the center tube of the fuel filter element.

As shown in FIGS. 1 and 4, the fixed housing 16 includes a base end 20 and a standpipe 22 extends upwardly from the base end 20 into the interior of the fixed housing. In this embodiment, the standpipe 22 forms an inlet for fuel to be introduced into the fuel filter assembly 10. The base 20 also includes a drain hole(s) 24 that is in fluid communication with the fuel tank or other fuel storage location through which air and/or fuel mixed with air is returned to the fuel tank after being vented from the fuel filter.

The cover 18 also includes attachment structure 26 defined on the interior thereof that detachably engages with corresponding structure formed at the upper end of the filter element 12 so that when the cover 18 is removed, the filter element 12 is removed with the cover 18. The filter element 12 can then be removed from the cover for replacement. Attachment structures between a removable cover and a filter element for removing the filter element when the cover is removed are known in the art.

Turning now to the filter element 12, the filter element is designed to filter the incoming fuel entering through the standpipe 22 prior to the fuel flowing to the stage 2 filter 200. In the illustrated embodiment, the filter element is designed for inside-out flow with the fuel entering through the standpipe 22, flowing generally radially outward through the filter element which filters the fuel, and then flowing to and through the stage 2 filter element before exiting out through a fuel outlet.

Figure 2:
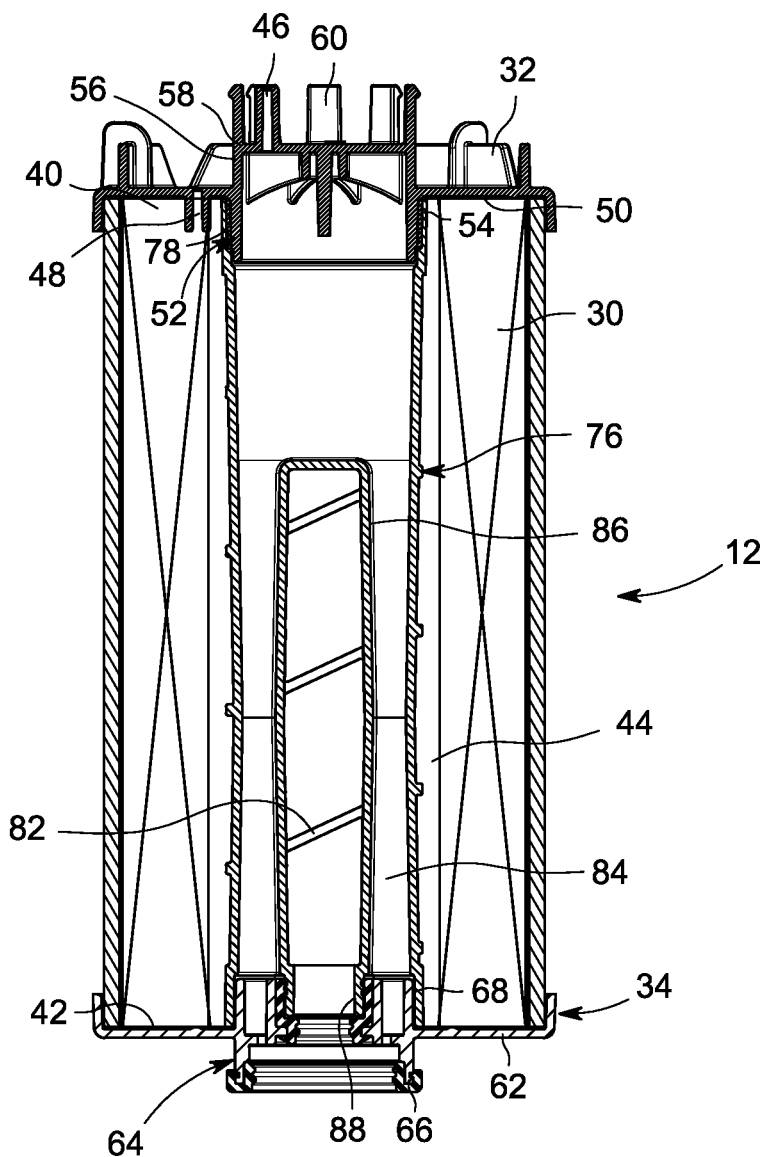
FIG. 2 is a cross-sectional view of the fuel filter element of FIG. 1.
Figure 3:
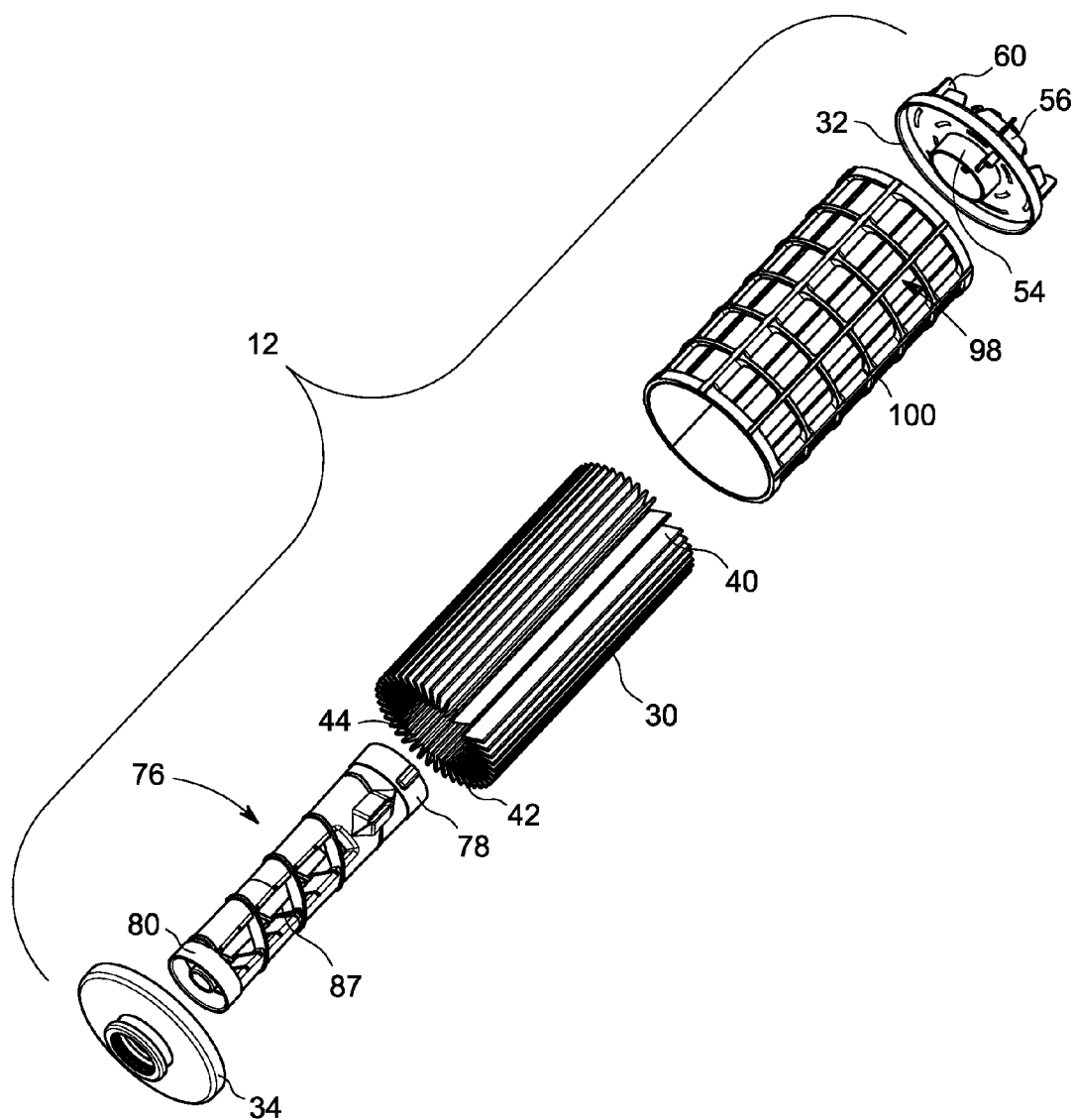
FIG. 3 is an exploded view of the components of the fuel filter element of FIG. 1.

With reference to FIGS. 1-3, the filter element 12 includes a ring of filtration media 30, a first or upper end cap 32, a second or lower end cap 34, and a center tube 76. The filtration media 30 has a first or upper end 40 and a second or lower end 42 and circumscribes a central cavity 44. In the illustrated embodiment, the filtration media 30 is pleated and is generally cylindrical in construction, although other forms and shapes of filtration media can be used.

The first end cap 32 is sealingly attached to the first end 40 of the filtration media using any suitable attachment method, for example using an adhesive or embedding the end 40 into the end cap 32 which can be made of plastic or metal. The first end cap 32 is a closed end cap in that fuel is not intended to flow through the end cap 32. However, as described further below, the end cap 32 includes an air vent passageway 46 and a media air vent 48 which permit venting of air through the end cap 32.

As best seen in FIGS. 2 and 3, the end cap 32 includes a plate section 50 that is attached to the first end 40 of the filtration media 30. The plate section 50 surrounds a skirt 52 that includes a portion 54 extending downwardly into the central cavity 44 and a portion 56 that extends upwardly. A plate 58 extends across the skirt portion 56 to close the skirt 52. A plurality of resilient fingers 60 extend upwardly from the plate 58 for engagement with the attachment structure 26 on the cover 18 to connect the filter element 12 to the cover 18.

As shown in FIG. 2, the air vent passageway 46 is formed in and extends through the plate 58. This provides fluid communication between the upper end of the interior of the fuel filter assembly 10 and the central cavity 44 so that air from the upper end of the fuel filter can vent into the central cavity 44.

In addition, the media air vent 48 is formed in the plate section 50 so that it is located radially outward from the air vent passageway 46. As will be discussed further below, the media air vent 48 is disposed on the unfiltered side of the filtration media 30 between two of the pleats.

The second end cap 34 is sealingly attached to the second end 42 of the filtration media using any suitable attachment method, for example using an adhesive or embedding the end 42 into the end cap 34 which can be made of plastic or metal.

With reference to FIGS. 2-4, the second end cap 34 includes a plate section 62 that is attached to the second end 42 of the filtration media 30. The plate section 62 surrounds a skirt 64 that includes a portion 66 extending downwardly and a portion 68 that extends upwardly. A circumferential wall 70 extends radially inwardly from the skirt 64, and a second skirt portion 72 extends upwardly from the inner edge of the circumferential wall 70 spaced from and substantially parallel to the skirt portion 68. As best seen in FIG. 4, a plurality of vent openings 74 are formed in and extend through the wall 70 to place the space between the skirt portions 68, 72 in fluid communication with the opposite side of the end cap 34.

Returning to FIGS. 2 and 3, a center tube 76 is disposed within the central cavity 44. The center tube 76 has a first end 78 sealingly connected to the first end cap 32 and a second end 80 sealingly connected to the second end cap 34. In particular, the first end 78 is attached to the skirt portion 54 of the end cap 32 and the second end 80 is attached to the skirt portion 68 (see FIG. 4). The attachment between the end 78 and the skirt portion 54, and between the end 80 and the skirt portion 68, can be accomplished in any suitable manner so long as fluid leakage between the surfaces is prevented, for example a friction fit, using adhesive, welding or combinations thereof.

The center tube 76 further includes a fuel passageway 82 and one or more air vent passageways 84. The passageways 82, 84 are defined by a wall 86 within the center tube 76 that defines an opening 87 that extends from one side of the center tube to the other for fuel to be filtered to enter into the central cavity 44 of the filter media 30. At the base of the wall 86 a cylindrical tube 88 is formed through which the standpipe 22 can extend as shown in FIG. 4.

As best seen in FIG. 4, a first cylindrical gasket 90 is disposed between the tube 88 and the skirt portion 72 to seal between the tube 88 and the skirt portion 72. The gasket 90 also includes a cylindrical portion 92 that projects radially inward beyond the tube 88 for sealing with the outer surface of the standpipe 22. The base of the gasket 90 is supported by a small rib 94 that projects radially inwardly from the skirt portion 72.

A second cylindrical gasket 96 is attached to the inner surface of the skirt portion 66 for sealing between the second end cap 34 and the base end 20 of the fixed housing 16 when the filter element is installed.

The first and second gaskets 90, 96 can be secured in any suitable manner, for example using snap features, using an adhesive, or being overmolded onto the respective skirt portions.

Returning to FIGS. 2 and 3, the filter element 12 can also include a coalescing element 98 surrounding the filtration media 30 and an outer support wrap 100. The coalescing element 98 is designed to coalesce water from the fuel. The outer coalescing element 98 has a first end connected to the plate section 50 of the first end cap 32 and a second end connected to the plate section 62 of the second end cap 34. However, use of the coalescing element is optional. The support wrap 100 helps to support the filtration media 30 and, if present, the coalescing element 98.

Figure 7:
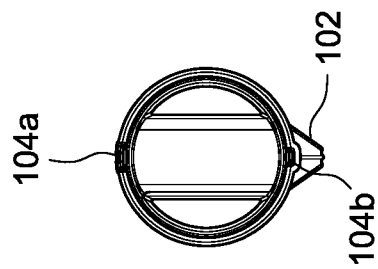
FIG. 7 is an end view of the center tube of the fuel filter element of FIG. 5 illustrating alignment features on the end of the center tube.
Figure 8:
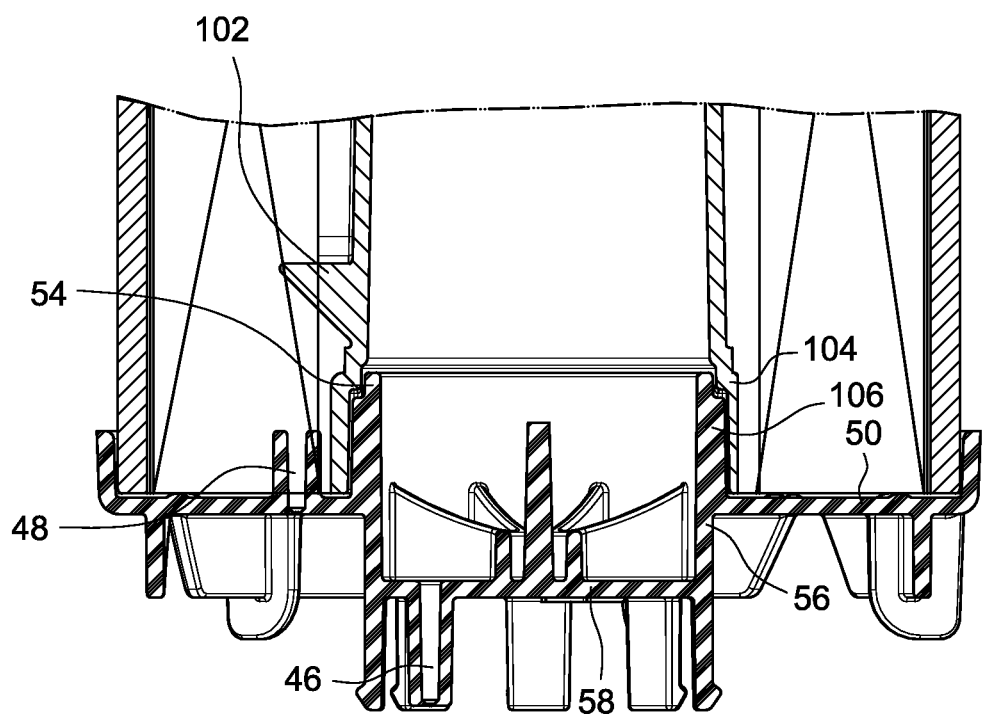
FIG. 8 is a close-up view of the engagement between the center tube and the upper end plate of the fuel filter element of FIG. 5.

As indicated above, the media air vent 48 is disposed on the unfiltered side of the filtration media 30 between two of the pleats. With reference to FIGS. 5-8, to facilitate proper positioning of the media air vent 48, a pleat separation element 102 is formed on the outer surface of the center tube 76 adjacent to the first end 78 thereof. When the center tube 76 is assembled into the filter element, the pleat separation element 102 is also adjacent to the media air vent 48 on the first end cap 32 as best seen in FIG. 8.

Figure 6:
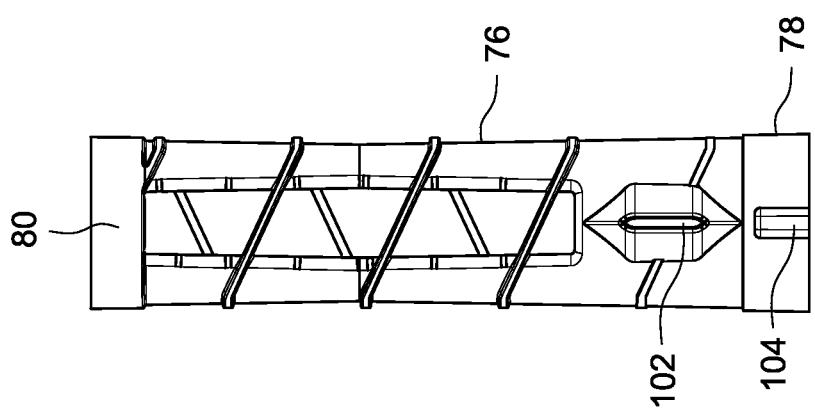
FIG. 6 is a side view of the center tube of the fuel filter element of FIG. 5.

As best seen in FIG. 6, the pleat separation element 102 is a wedge-shaped element that projects from the outer surface of the center tube. As the center tube 76 is being installed into the filtration media 30, the pleat separation element 102 fits between two adjacent pleats and separates those two pleats to create a larger space between the two pleats so that the media air vent 48 can more easily be positioned between the two pleats on the unfiltered or dirty side thereof.

In addition, alignment elements 104a, 104b are formed at the first end 78 of the center tube 76 and corresponding alignment elements 106 are formed on the skirt portion 54. The alignment elements 104a, 104b, 106 help to ensure proper orientation of the center tube 76, to help properly position the pleat separation element 102 relative to the media air vent 48. In the illustrated embodiment, the alignment elements 104a, 104b comprise radially outward protruding channels formed on diametrically opposite sides of the center tube 76, and the alignment elements 106 comprise correspondingly shaped protrusions formed on the skirt portion 54 that fit into the channels. As shown in FIG. 7, the alignment elements 104a, 104b are of different size with the alignment element 104a being larger than the alignment element 104b. The alignment elements 106 would also have corresponding different sizes. Therefore, the center tube 76 can only be attached to the skirt portion 54 in the correct orientation.

Operation of the fuel filter assembly 10 will now be described with reference to FIG. 1. Unwanted air can enter the receptacle 14 as a result of a new filter element 12 being installed and/or as a result of air entrained in fuel entering through the standpipe 22. During operation, fuel to be filtered enters via the standpipe 22, into the fuel passageway 82, and through opening 87 into the central cavity of the filtration media. The fuel then flows radially outward through the filtration media which filters the fuel. If the coalescing element is present, the fuel flows through the coalescing element, and then passes through the stage 2 filter element 208. Coalesced water drops sink to the lower most portion of the module where it can be drained through a suitable drain.

Air inside the housing 14 is shown by the diagrammatic bubbles in FIG. 1. Air between the outer side of the filtration element and the inside of the filter housing and air at the upper end of the filter housing can vent through the air vent passageway 46 to the interior of the center tube 76. Any air that enters through the standpipe and becomes trapped on the dirty side of the filtration media within the central cavity 44 can vent to the upper end of filter housing through the media air vent 48 and then vent through the air vent 46 into the interior of the center tube. Once in the center tube, the air flows down to the base of the filter element and through the vent opening(s) 74 and from there through the drain hole 24 back to the fuel tank.

With reference to FIGS. 9-12, the stage 2 fuel filter assembly 200 will now be described. The fuel filter assembly 200 is somewhat similar in construction to the fuel filter assembly 10, with one of the biggest differences being that the fuel filter element of the filter assembly 200 does not include a media air vent and has a different flow direction.

Figure 9:
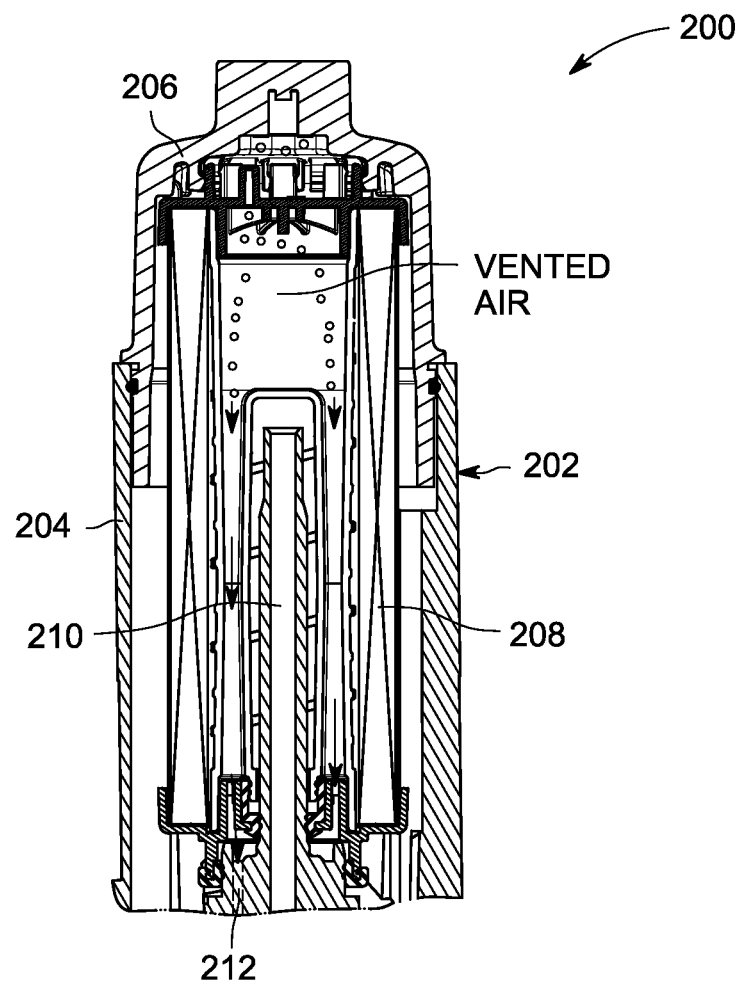
FIG. 9 illustrates another embodiment of a fuel filter element described herein removably installed within a respective receptacle in the fuel filter module.

With reference to FIG. 9, the fuel filter assembly 200 includes a receptacle 202 having a fixed housing 204 and a removable receptacle cover 206 that is removably attached to the fixed housing, for example using threads. In use, the cover 206 is attached to the fixed housing 204 so that the two define an interior volume sufficient to receive the fuel filter element 208. The interior of the receptacle 202 is in fluid communication with the receptacle of the stage 1 filter so that fuel that has been filtered by the stage 1 filter flows into the receptacle 202 for filtration by the fuel filter element 208. The cover 206 is sealed with the fixed housing 204 to prevent fuel leaks from the interior thereof. The cover 206 can be removed from the fixed housing to access the interior volume for removal of the filter element.

Figure 12:
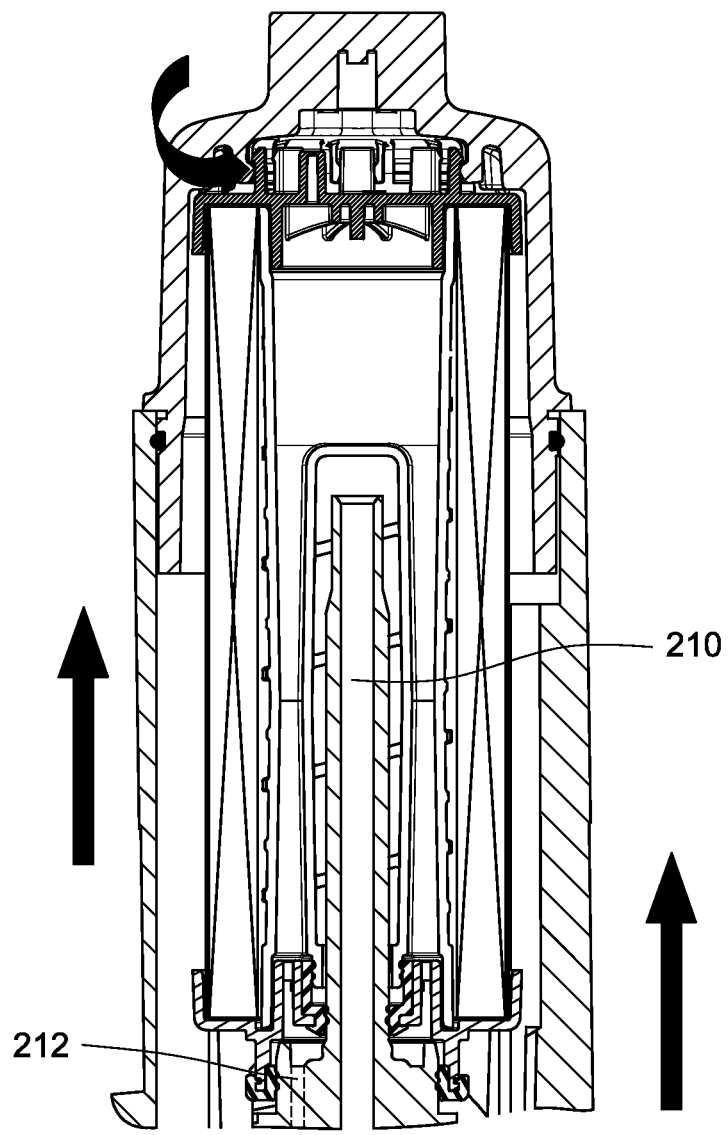
FIG. 12 is a view similar to FIG. 9 but showing partial removal of the fuel filter element from its receptacle in the fuel filter module.

As shown in FIGS. 9 and 12, the fixed housing 204 includes a base end and a standpipe 210 extends upwardly from the base end into the interior of the fixed housing. In this embodiment, the standpipe 210 forms an outlet for fuel that has been filtered by the fuel filter element 208. The base also includes a drain hole(s) 212 that is in fluid communication with the fuel tank or other fuel storage location through which air and/or fuel mixed with air is returned to the fuel tank after being vented from the fuel filter. Fuel can also drain through the drain hole(s) 212 back to the fuel tank when the filter element 208 is lifted upward so that the fuel filter assembly 200 can auto-drain during filter element changes.

Similar to the filter assembly 10, the cover 206 also includes attachment structure defined on the interior thereof that detachably engages with corresponding structure formed at the upper end of the filter element 208 so that when the cover 206 is removed, the filter element 208 is removed with the cover. The filter element can then be removed from the cover for replacement. Attachment structures between a removable cover and a filter element for removing the filter element when the cover is removed are known in the art.

Turning now to the filter element 208, the filter element is designed to filter the fuel already filtered by the stage 1 filter element prior to the fuel exiting the fuel module through the standpipe 210. Thus, in the illustrated embodiment, the filter element 208 is designed for outside-in flow with the fuel flowing generally radially inwardly through the filter element which filters the fuel, enters the standpipe 210 through suitable openings, and then flowing out through the standpipe 210.

Figure 10:
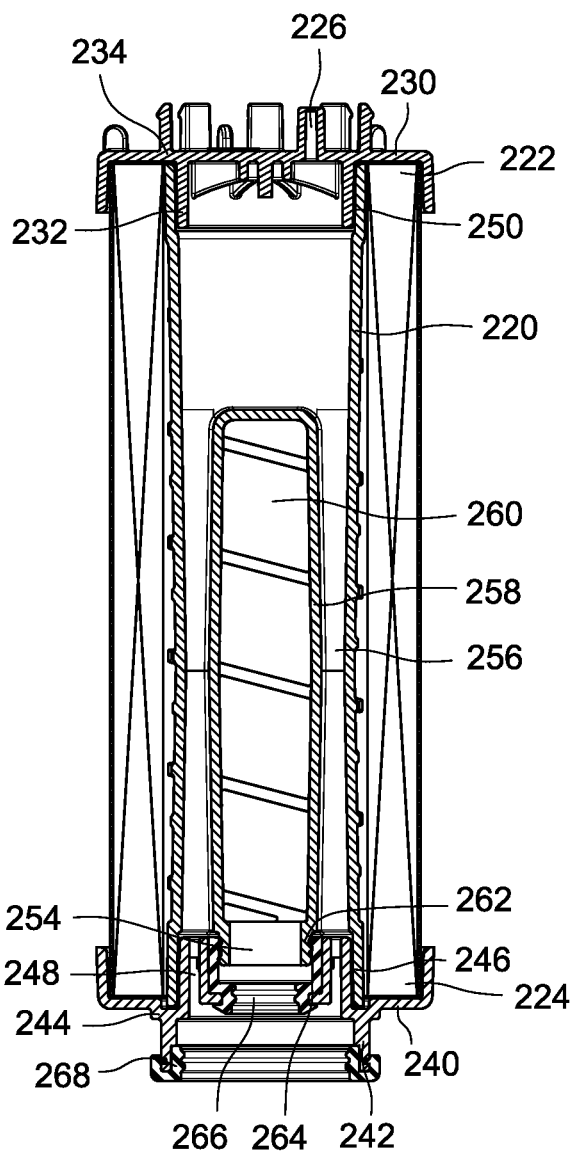
FIG. 10 is a cross-sectional view of the fuel filter element of FIG. 9.
Figure 11:
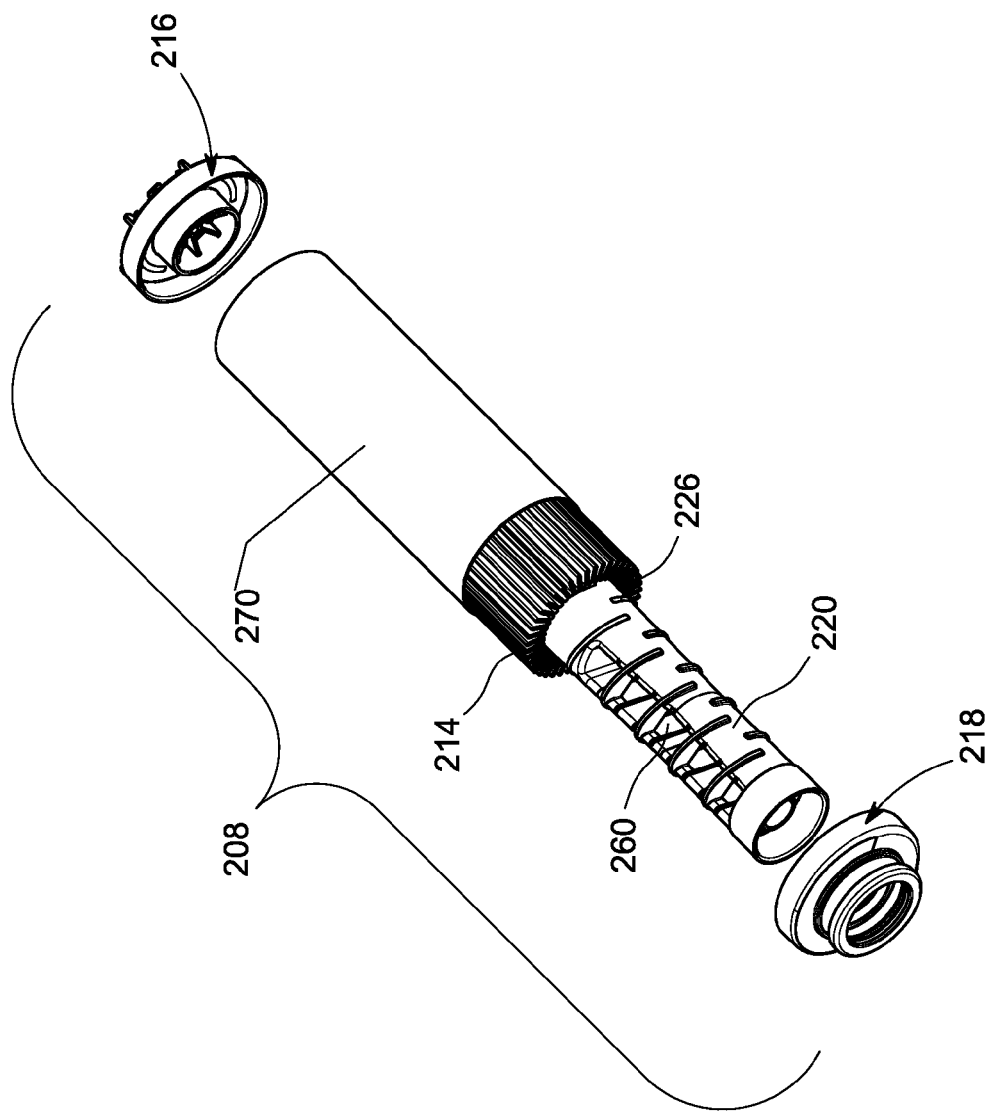
FIG. 11 is an exploded view of the components of the fuel filter element of FIG. 9.

With reference to FIGS. 9-11, the filter element 208 includes a ring of filtration media 214, a first or upper end cap 216, a second or lower end cap 218, and a center tube 220. The filtration media 214 has a first or upper end 222 and a second or lower end 224 and circumscribes a central cavity 226. In the illustrated embodiment, the filtration media 214 is pleated and is generally cylindrical in construction, although other forms and shapes of filtration media can be used.

The first end cap 216 is sealingly attached to the first end 222 of the filtration media using any suitable attachment method, for example using an adhesive or embedding the end 222 into the end cap 216 which can be made of plastic or metal. The first end cap 216 is a closed end cap in that fuel is not intended to flow through the end cap. However, as described further below, the end cap 216 includes an air vent passageway 226, similar to the air vent passageway 46 of the filter element 12, which permits venting of air through the end cap.

As best seen in FIGS. 10 and 11, the end cap 216 includes a plate section 230 that is attached to the first end 222 of the filtration media 214. The plate section 230 surrounds a skirt portion 232 that extends downwardly into the central cavity 226. A plate 234 extends across the skirt portion 232 from the inner end of the plate section 230 to close the skirt portion. As with the filter element 12, a plurality of resilient fingers extend upwardly from the end cap 216 for engagement with the attachment structure on the cover 206 to connect the filter element to the cover.

As shown in FIG. 10, the air vent passageway 226 is formed in and extends through the plate 234. This provides fluid communication between the upper end of the interior of the fuel filter assembly 200 and the central cavity 226 so that air from the upper end of the fuel filter can vent into the central cavity 226.

The second end cap 218 is sealingly attached to the second end 224 of the filtration media using any suitable attachment method, for example using an adhesive or embedding the end 224 into the end cap 218 which can be made of plastic or metal.

With reference to FIGS. 10-12, the second end cap 218 includes a plate section 240 that is attached to the second end 224 of the filtration media 214. The plate section 240 surrounds a skirt portion 242 extending downwardly. A circumferential wall 244 interconnects the plate section 240 and the skirt portion 242, and a skirt portion 246 extends upwardly from the inner edge of the circumferential wall 244. The skirt portion 246 has a sufficient radial thickness in which a plurality of axially extending vent openings 248 are formed that extend through the skirt portion to place the upper side of the skirt portion 246 in fluid communication with the opposite side of the end cap 218.

Returning to FIGS. 10 and 11, the center tube 220 is disposed within the central cavity 226. The center tube 220 has a first end 250 sealingly connected to the first end cap 216 and a second end 252 sealingly connected to the second end cap 218. In particular, the first end 250 is attached to the skirt portion 232 of the end cap 216 and the second end 252 is attached to the skirt portion 246 (see FIG. 10). The attachment between the end 250 and the skirt portion 232, and between the end 252 and the skirt portion 246, can be accomplished in any suitable manner so long as fluid leakage between the surfaces is prevented, for example a friction fit, using adhesive, welding or combinations thereof.

The center tube 220 further includes a fuel outlet passageway 254 and one or more air vent passageways 256. The passageways 254, 256 are defined by a wall 258 within the center tube 220 that defines an opening 260 that extends from one side of the center tube to the other for fuel that has been filtered to enter into the standpipe 210. At the base of the wall 258 a cylindrical tube 262 is formed through which the standpipe 210 can extend as shown in FIGS. 9 and 12.

As best seen in FIG. 10, a first cylindrical gasket 264 is disposed between the tube 262 and the skirt portion 246 to seal between the tube and the skirt portion. The gasket 264 also includes a cylindrical portion 266 that projects radially inward beyond the tube 262 for sealing with the outer surface of the standpipe 210.

A second cylindrical gasket 268 is attached to the inner surface of the skirt portion 242 for sealing between the second end cap 218 and the base end of the fixed housing 204 when the filter element is installed.

The first and second gaskets 264, 268 can be secured in any suitable manner, for example using snap features, using an adhesive, or being overmolded onto the respective skirt portions.

Returning to FIGS. 10 and 11, the filter element 208 can also include a hydrophobic screen 270 surrounding the filtration media 214. The screen 270 is designed to remove water from the fuel. The screen 270 has a first end connected to the plate section 230 of the first end cap 216 and a second end connected to the plate section 240 of the second end cap 218. However, use of the hydrophobic screen 270 is optional.

Operation of the fuel filter 200 will now be described with reference to FIGS. 9 and 12. During operation, fuel from the stage 1 filter enters into the receptacle 202, flows radially inwardly through the filtration media which filters the fuel. After being filtered, the fuel flows into the opening 260 in the center tube 220 and into a suitable opening(s) in the standpipe 210, and then out through the standpipe.

Air inside the receptacle 202 is shown by the diagrammatic bubbles in FIG. 9. Air between the outer side of the filtration element and the inside of the receptacle and air at the upper end of the filter housing can vent through the air vent passageway 226 to the interior of the center tube 220. Once in the center tube, the air flows down to the base of the filter element and through the vent opening(s) 248 and from there through the drain hole(s) 212 back to the fuel tank.

In addition, as illustrated in FIG. 12, upon removal of the cover 206, the filter element 208 also gets lifted up. When the filter element is lifted up, the filter element is unseated from base of the fixed housing 204, thereby exposing the drain hole(s) 212. Any fuel remaining in the housing 204 can drain through the drain hole(s) 212 and back to the fuel tank.

With reference to FIGS. 13-18, another embodiment of a stage 1 fuel filter element 300 is illustrated that is configured for inside-out fuel flow. The fuel filter element 300 includes a center tube 302 that is generally cage-like in construction, but which includes an air vent passageway 304 that extends from a first solid end section 306 to a second solid end section 308. The end section 306 seals with a skirt portion 310 formed on an upper end cap 312, while the end section 308 seals with a skirt portion 314 formed on a lower end cap 316. The upper end cap 312 is formed with an air vent passageway 318 which allows vent air to enter into the space 320 defined by the skirt portion 310, the solid end section 306, the end cap 312, and a plate 322 that closes off the upper end of the center tube 302. The air can then flow into the passageway 304 and down towards the base of the filter element 300.

Figure 13:
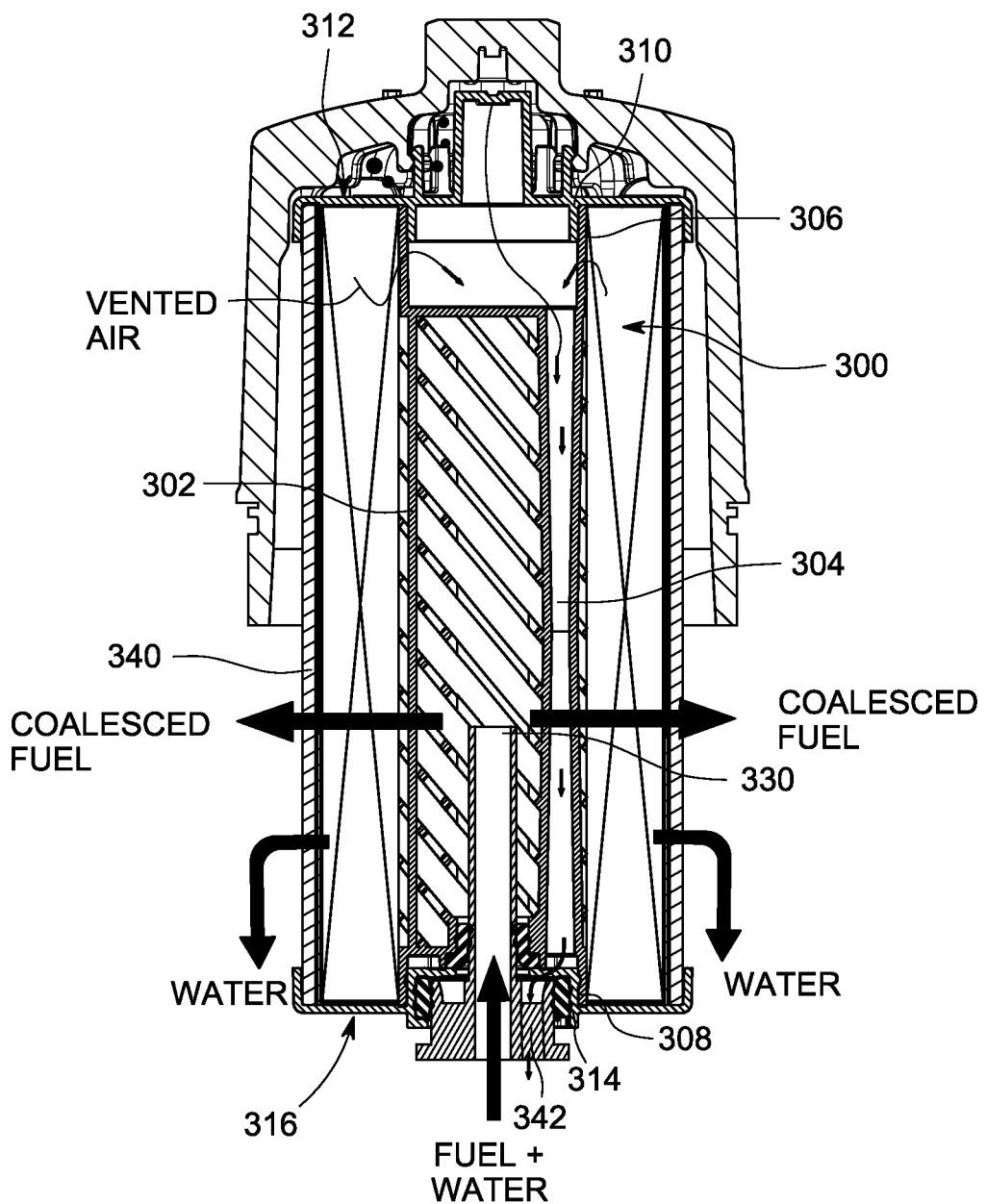
FIG. 13 is a cross-sectional view of another embodiment of a stage 1 fuel filter element disposed on a standpipe.
Figure 17:
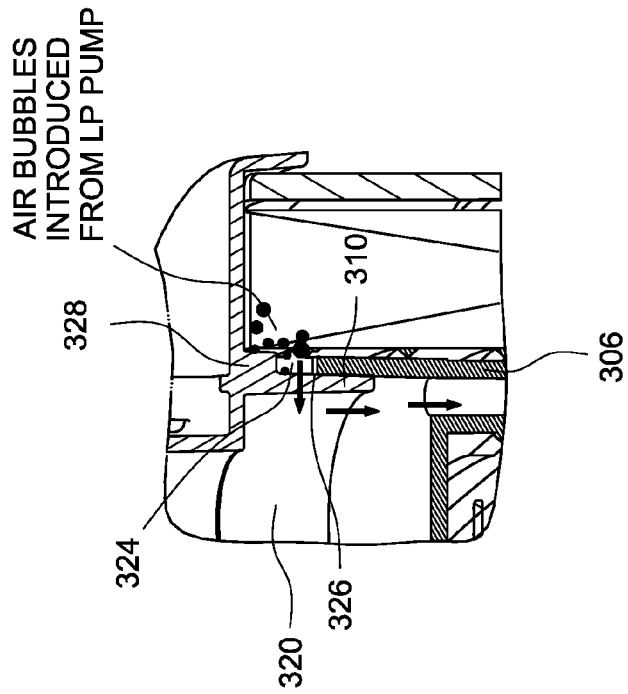
FIG. 17 illustrates the venting of air from the filtration media through the end cap of the fuel filter element of FIG. 13.
Figure 15:
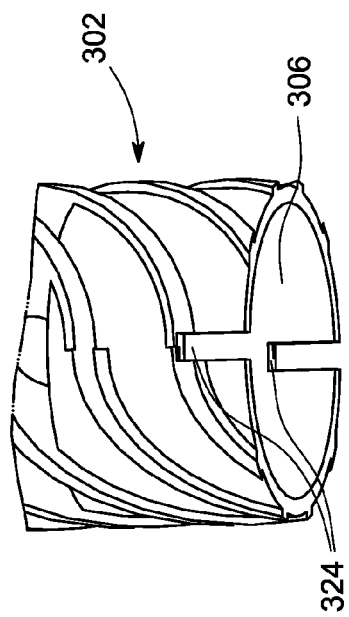
FIG. 15 is a view of the upper end of the center tube of the fuel filter element of FIG. 13.
Figure 16:
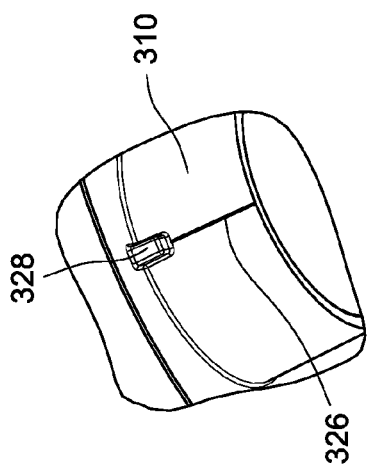
FIG. 16 illustrates an alignment feature and vent passageway formed in the upper end cap of the fuel filter element of FIG. 13.

In addition, the solid end section 306 and the skirt portion 310 are configured to allow air to vent from the dirty side of the filtration media and through the solid end section 306 and the skirt portion 310 into the space 320 as shown by the arrows in FIGS. 13 and 17. With reference to FIGS. 15 and 16, the solid end section 306 of the center tube 302 includes a pair of opposing slots 324 formed therethrough. The skirt portion 310 includes a pair of opposing small grooves 326 (only one groove is visible in FIG. 16) that extend through the skirt portion and that when properly assembled are positioned adjacent to the slots 324. The skirt portion 310 also includes a pair of keys 328 that fit into the slots 324 for properly orienting the center tube 302.

As shown in FIG. 17, air that is introduced into the fuel filter module via fuel entering the standpipe 330 collects on the dirty side of the filtration media. The air is able to vent through the slots 324 and then through the grooves 326 into the space 320 where the air can then enter the air vent passageway 304 for venting from the filter module.

Figure 14:
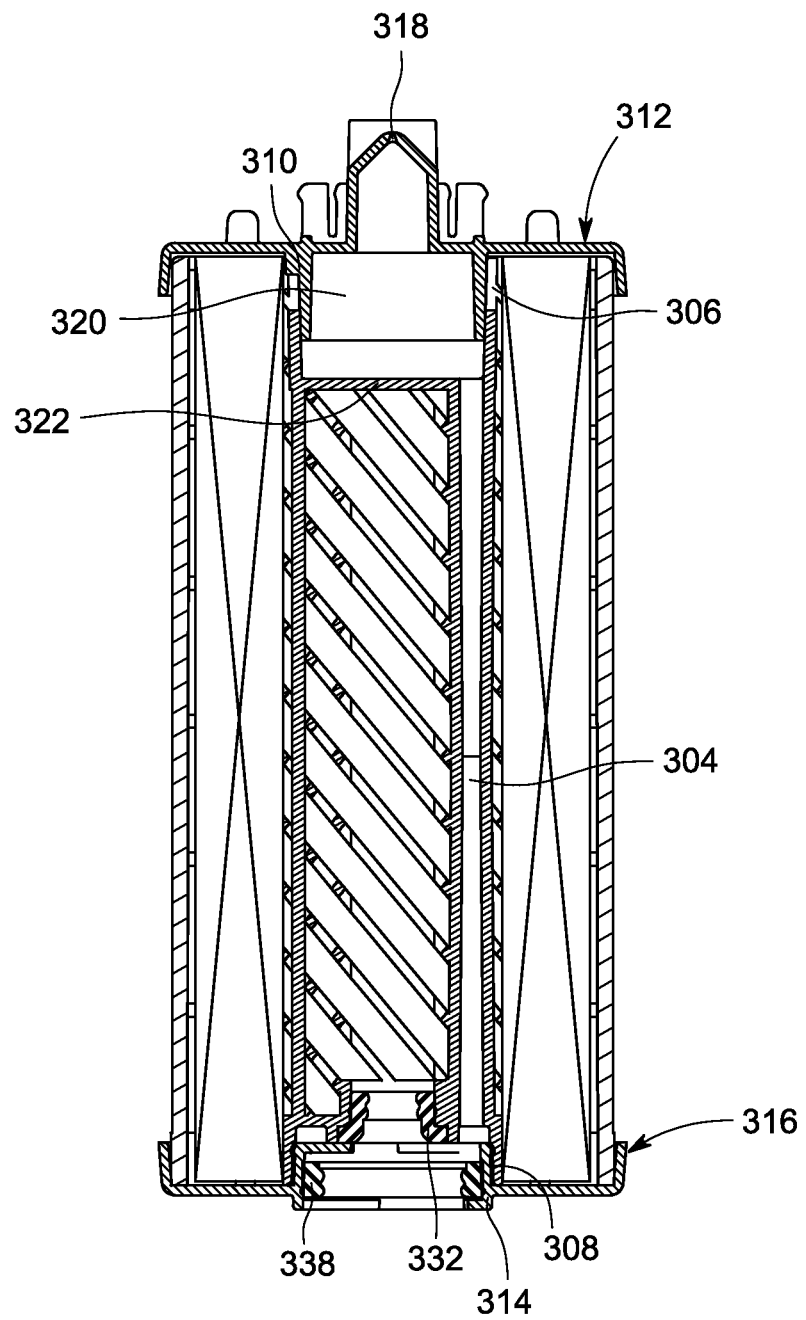
FIG. 14 is a cross-sectional view of the fuel filter element in FIG. 13.

With reference to FIGS. 13-14 and 18, the base of the filter element 300 will now be described. A gasket 332 is installed on an inside of the center tube 302. A first plurality of tabs 334 project radially inwardly from the upper end of the skirt portion 314, while a second plurality of tabs 336 project radially inwardly from a lower end of the skirt portion. The lower end of the gasket 332 can be supported by or spaced from the tabs 334. A second gasket 338 is disposed between the tabs 334 and the tabs 336 for sealing with the base of the fuel filter module.

As shown in FIGS. 13 and 18, fuel to be filtered enters via the standpipe 330. The fuel then flows radially outwardly through the filtration media which filters the fuel. After being filtered, the fuel then flows to the stage 2 filter. Optionally, a coalescing element 340 can be provided around the filtration media for coalescing water in the fuel.

Air within the filter housing can vent from the module via the air vent passageway 318 into the space 320 and through the passageway 304. Likewise, air on the dirty side of the filtration media can vent through the slots 324, through the channels 326, into the space 320 and through the passageway 304. The air in the passageway 304 flows to the base of the filter element where it exits the passageway 304, flows through gaps between the tabs 334 and into a drain 342 (see FIG. 13) in the base of the module which can be fluidly connected to the fuel tank.

FIG. 19 illustrates an embodiment that is similar to FIG. 18, but instead of the first set of tabs 334, a continuous flange 350 is provided with a plurality of holes 352 formed in the flange 350 to allow air to vent through the flange 350 and into the drain 342.

Figure 20:
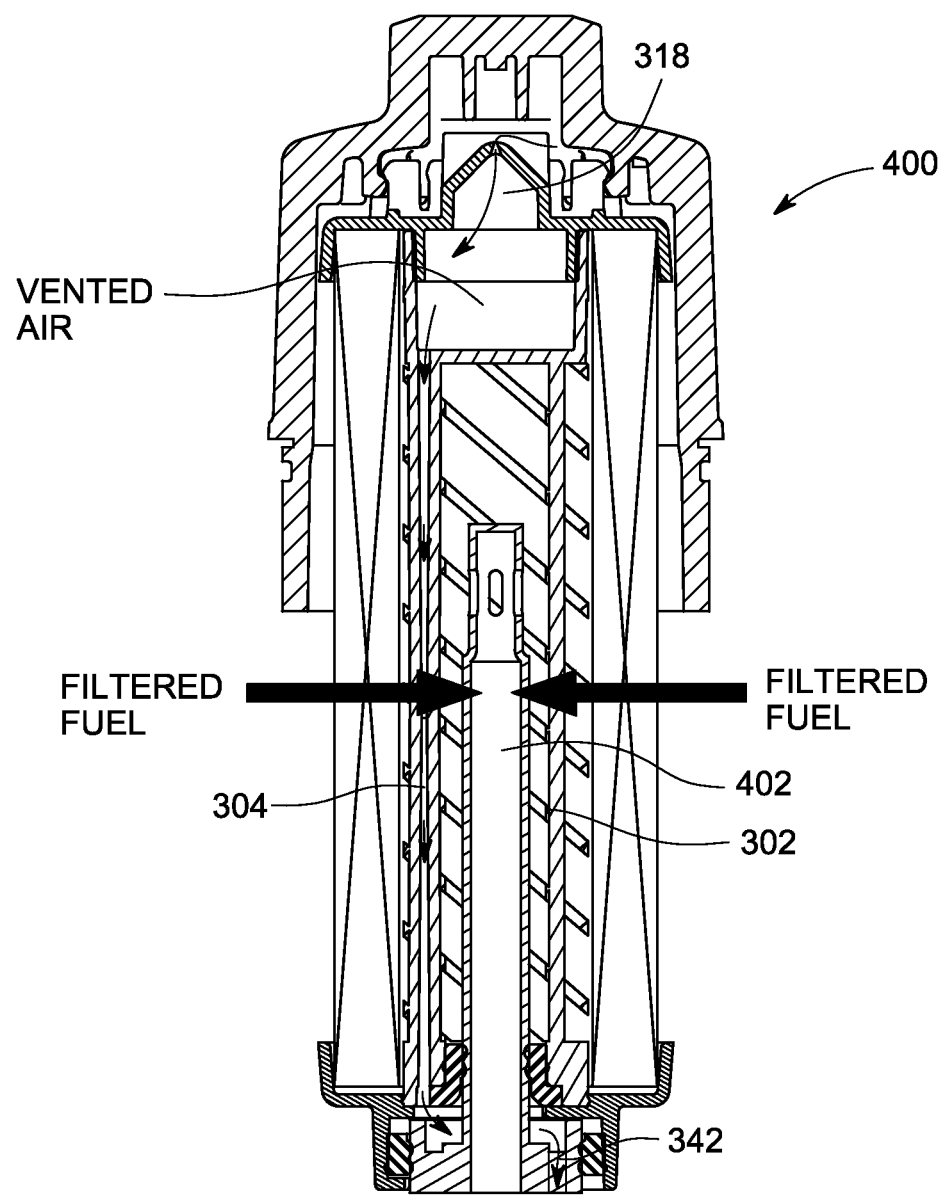
FIG. 20 is a cross-sectional view of another embodiment of a stage 2 fuel filter element disposed on a standpipe.
Figure 21:
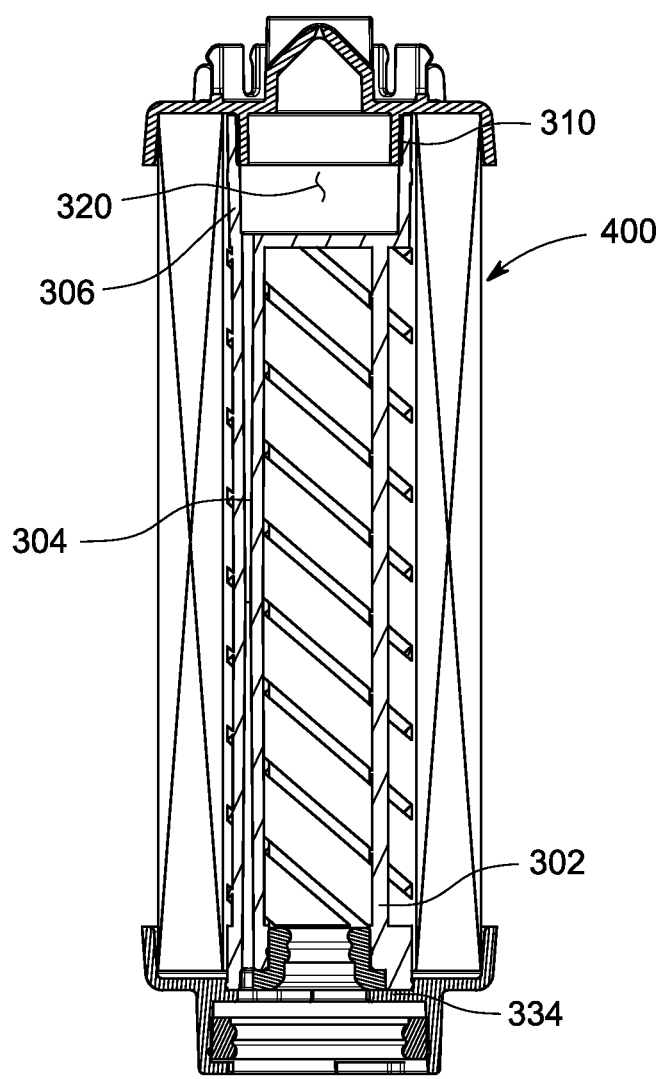
FIG. 21 is a cross-sectional view of the fuel filter element of FIG. 20.

With reference to FIGS. 20-21, another embodiment of a stage 2 fuel filter element 400 is illustrated that is configured for outside-in fuel flow. The fuel filter element 400 is similar in construction to the fuel filter element 300 including the center tube 302, vent air passageway 304, the air vent passageway 318 in the upper end cap, and the like. Since the fuel filter element 400 is similar in construction to the fuel filter element 300, the fuel filter element 400 need not be described in detail. However, the fuel filter element 400 does not include the slots and grooves to allow air to vent from the dirty side of the filtration media and through the solid end section 306 and the skirt portion 310 into the space 320.

As shown in FIG. 20, fuel to be filtered enters through an inlet. The fuel then flows radially inwardly through the filtration media which filters the fuel. After being filtered, the fuel then flows into one or more openings in a standpipe 402 and out of the module.

Air within the module can vent from the module via the air vent passageway 318 into the space 320 and through the passageway 304. The air in the passageway 304 flows to the base of the filter element where it exits the passageway 304, flow through gaps between the tabs 334 and into a drain 342 in the base of the housing which can be fluidly connected to the fuel tank.

Although the upper end cap has been described as having a single air vent passageway, such as the passageway 46, more than one air vent passageway can be provided in any of the described embodiments. Likewise, although a single media air vent has been described, more than one media air vent can be provided in any of the described embodiments.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:
1. A filter element comprising:
   a ring of pleated filtration media having a first end and a second end and circumscribing a central cavity;

a first end cap sealingly attached to the first end of the filtration media, the first end cap including a vent passage and a media air vent;

a second end cap sealingly attached to the second end of the filtration media, the second end cap including a plurality of vent openings extending therethrough;

a center tube disposed within the central cavity, the center tube having a first end connected to the first end cap and a second end connected to the second end cap, the center tube further includes a fluid passageway and an air vent passageway, the air vent passageway being fluidly separated from the fluid passageway, and the air vent passageway is in fluid communication with the vent passage in the first end cap and with the vent openings in the second end cap;

a pleat separation element on the center tube adjacent to the first end thereof and adjacent to the media air vent on the first end cap, the pleat separation element being disposed between two pleats of the ring of pleated filtration media; and first and second seals, the first seal being located radially inward of the second seal, and the first seal is attached to the second end cap or to the center tube and is positioned to seal with a standpipe; the second seal is attached to the second end cap and is positioned to seal with a housing; and the vent openings in the second end cap are between the first seal and the second seal.

2. The filter element of claim 1, wherein the filtration media has an unfiltered fluid side and a filtered fluid side; and wherein the media air vent on the first end cap is located radially outward from the vent passage in the first end cap and is disposed on the unfiltered side of the media between the two pleats.

3. The filter element of claim 1, further comprising an alignment element at the first end of the center tube that is engaged with a corresponding alignment element on the first end cap.

4. The filter element of claim 1, further comprising an outer coalescing element surrounding the filtration media, the outer coalescing element having a first end thereof connected to the first end cap and a second end thereof connected to the second end cap.

5. The filter element of claim 1, wherein the filter element is a fuel filter that is designed for inside-out flow of fuel, with fuel entering the center tube and the central cavity via the fluid passageway, then flowing generally radially outward through the filtration media.

6. The filter element of claim 1, wherein the fluid passageway is disposed on a central axis of the central cavity, and the air vent passageway is radially outward of the fluid passageway.

7. The filter element of claim 1, wherein the second seal is axially spaced from the first seal.

8. The filter element of claim 1, wherein the filter element is a fuel filter that is designed for outside-in flow of fuel, with fuel flowing generally radially inward through the filtration media, and then into the central cavity and the fluid passageway of the center tube.

9. A filter element comprising:

a ring of pleated filtration media having a first end and a second end and circumscribing a central cavity, and having an unfiltered fluid side and a filtered fluid side;

a first end cap sealingly attached to the first end of the filtration media, the first end cap including a vent passage and a media air vent located radially outward from the vent passage, the media air vent is disposed on the unfiltered side of the media between two pleats of the ring of pleated filtration media;

a second end cap sealingly attached to the second end of the filtration media, the second end cap including a plurality of vent openings extending therethrough;

a center tube disposed within the central cavity, the center tube having a first end connected to the first end cap and a second end connected to the second end cap, the center tube further includes a fluid passageway and an air vent passageway, the air vent passageway being fluidly separated from the fluid passageway, and the air vent passageway is in fluid communication with the vent passage in the first end cap and with the vent openings in the second end cap;

a pleat separation element on the center tube adjacent to the first end thereof and adjacent to the media air vent on the first end cap, the pleat separation element being disposed between the two pleats;

an alignment element at the first end of the center tube that is engaged with a corresponding alignment element on the first end cap;

first and second seals, the first seal being located radially inward of the second seal, and the first seal is attached to the second end cap or to the center tube and is positioned to seal with a standpipe; the second seal is attached to the second end cap and is positioned to seal with a housing; and the vent openings in the second end cap are between the first seal and the second seal.

10. The filter element of claim 9, further comprising an outer coalescing element surrounding the pleated filtration media, the outer coalescing element having a first end thereof connected to the first end cap and a second end thereof connected to the second end cap.

11. The filter element of claim 9, wherein the filter element is a fuel filter that is designed for inside-out flow of fuel, with fuel entering the center tube and the central cavity via the fluid passageway, then flowing generally radially outward through the filtration media.

12. The filter element of claim 9, wherein the fluid passageway is disposed on a central axis of the central cavity, and the air vent passageway is radially outward of the fluid passageway.

13. The filter element of claim 9, wherein the second seal is axially spaced from the first seal.

* * * * *